United States Patent [19]

Fukushima et al.

[11] Patent Number: 5,444,916

[45] Date of Patent: Aug. 29, 1995

[54] ELECTRONIC STEREO CLINO-COMPASS

[75] Inventors: Haruo Fukushima; Shosuke Soeda, both of Tokyo, Japan

[73] Assignee: Sato Kogyo Co., Ltd., Toyama, Japan

[21] Appl. No.: 141,941

[22] Filed: Oct. 28, 1993

[30] Foreign Application Priority Data

Jan. 25, 1993 [JP] Japan .................................. 5-010029

[51] Int. Cl.⁶ .............................................. G01C 17/28
[52] U.S. Cl. ........................................ 33/361; 364/559
[58] Field of Search ................... 33/340, 341, 355 R, 33/361, 365, 366; 364/505, 559

[56] References Cited

U.S. PATENT DOCUMENTS

| | | |
|---|---|---|
| 3,899,834 | 8/1975 | Harrison, Jr. . |
| 4,429,469 | 2/1984 | Tsushima et al. .................. 33/361 |
| 4,673,878 | 6/1987 | Tsushima et al. .................. 33/361 |
| 5,021,962 | 6/1991 | Helldörfer et al. ................. 364/559 |
| 5,095,630 | 3/1992 | Nomura et al. .................... 33/361 |
| 5,287,628 | 2/1994 | Yamaguchi et al. ................ 33/361 |

FOREIGN PATENT DOCUMENTS

| | | |
|---|---|---|
| 2629910 | 10/1989 | France . |
| 3915404 | 11/1990 | Germany . |
| 1-20411 | 1/1989 | Japan .................................. 33/361 |
| 1-173813 | 7/1989 | Japan .................................. 33/361 |
| 5-164558 | 6/1993 | Japan .................................. 33/361 |
| 1264113 | 2/1972 | United Kingdom . |
| 92/06465 | 4/1992 | WIPO .................................. 364/559 |

Primary Examiner—William A. Cuchlinski, Jr.
Assistant Examiner—G. Bradley Bennett
Attorney, Agent, or Firm—Wenderoth, Lind & Ponack

[57] ABSTRACT

An electronic stereo clino-compass which can be targeted directly at the discontinuous surface of a soil layer and in particular, where the running direction (azimuth) and inclination of a target surface can be measured quickly and easily without the necessity of specialized knowledge. The electronic stereo clino-meter includes a three axis inclination angle sensor for outputting an electrical signal taken as a measurement of an inclination angle, a three-axis azimuth angle sensor for outputting an electrical signal taken as a measurement of an azimuth angle taking the geomagnetic field as a basis, an analogue-to-digital converter for outputting digital signals converted from electrical signals outputted from each of the sensors, an arithmetic unit for providing an output from a calculation process carried out on the inclination angle and azimuth angle signals based on the output from the analogue-to-digital converter, a display conversion unit for converting electrical signals from the control unit or the memory unit in conformity with a predetermined display technique, and a display unit for displaying values converted by the display conversion unit.

3 Claims, 6 Drawing Sheets

ELECTRONIC STEREO CLINO-COMPASS

BACKGROUND OF THE INVENTION

1. Field of the Invention

The present invention relates to an electronic stereo clino-compass, for use in construction and civil engineering works, which measures a plane in a three-dimentional space, that is, an azimuth angle and an angle of inclination with respect to a horizontal plane normal to the direction of gravity.

2. Description of the Prior Art

Measurements of the direction and inclination of a normal surface in civil engineering works, measurements of direction and inclination of items such as pillars and floors in construction works and measurements of deformation of pillars and floors in house investigations are performed by human labor using precise surveying techniques as will be described later. In the measuring the azimuth angle of a discontinuous surface of a stratum in geological investigations (the so-called "strike" in the field of geology) and the angle of inclination (the so-called "dip" in geology), a mechanical clino-meter as will be described later has been used.

However, the above-mentioned conventional measuring technology has the following drawbacks.

(1) Where a precision survey is performed:
 (a) It is necessary to have an engineer who is skilled in survey technology.
 (b) Much time is required for the survey and data processing.
 (c) The process requires two persons of whom one takes the measurements and the other carries with him position targets to the survey points, respectively.
 (d) With house investigations, it is difficult to get a high-precision survey since an object to be measured is small and narrow.

(2) Where a clino-meter is used:
 (a) A certain degree of special knowledge of the field of this measurement technique is required to put the angled part of the clino-meter on a discontinuous surface of a stratum to measure the running direction (i.e., azimuth angle), and then target the side surface which is at right angles to this surface to measure the inclination.
 (b) Using a spirit level to take level measurements means that the accuracy of the level measurements is low, as does the use of roughly marked compasses.
 (c) Precision is lost over long periods of use due to general wear, such as friction and corrosion of the compass slider.
 (d) Time is required for the position of the magnetic pointer to settle. Time is also required for the person taking the measurements or an assistant to record data after taking the measurements. This means that a substantial period of time is required to take only one measurement. Also, if the person taking the measurements is changed, then another person taking the next measurements may take them in a slightly different way, so that the measurement precision is not stable.
 (e) The glass face of the compass is easily damaged, and will be damaged by an impact caused by dropping, for example.
 (f) As it is of a mechanical structure, it has a low resistance to impacts.

SUMMARY OF THE INVENTION

In order to overcome the problems encountered in conventional clino-meter technology, it is an object of the invention to provide an electronic stereo clino-compass. A clino-compass in the form of a unit is targeted directly at the discontinuous surface of a soil layer, so that measurements are taken by a measurement part and arithmetic operations are then performed on these measured results by an arithmetic unit. In particular, an electronic stereo clino-compass is provided where the running direction (bearing) and inclination of a target surface can be measured quickly and easily without the necessity of specialized knowledge.

It is a further object of the invention to provide a stereo clino-compass where the measuring part and the display for displaying the results can be put together to form a single body within an integral or one-piece casing, and further to have a separate type stereo clino-compass where the measurement part and the display part may be separate from each other so as to provide measurement flexibility.

To achieve these and other objects, according to the present invention there is provided an electronic stereo clino-compass which comprises inclination sensors and bearing sensors arranged along the directions of coordinate axes X, Y and Z. The outputs from these sensors are then passed through a circuit which converts them to digital signals and they are then transmitted to an arithmetic unit. This arithmetic unit then carries out arithmetic operations on an inclination angle and an azimuth (bearing) angle and sends the results to a control unit and a memory unit. These transmitted results are then converted to data to be used with a predetermined display method by a display conversion unit and the converted data are then displayed by a display unit. The memory unit stores the data transmitted from the arithmetic unit, and can exchange the data with external data by connecting external equipment.

In particular an electronic stereo clino-compass according to the present invention includes: a sensor area containing a three axis inclination angle sensor for outputting electrical signals taken as a measurement of an inclination angle, and a three axis azimuth angle sensor for outputting electrical signals taken as a measurement of a bearing angle; an analogue-to-digital converter for outputting the digital signals converted from electrical signals outputted from each of the sensors; an arithmetic unit for computing and providing both an inclination angle and azimuth angle signals based on the output from the analogue-to-digital converter; a control unit for controlling whether the signals outputted from the arithmetic unit are outputted directly or indirectly by external data; a memory unit for storing the inclination angle and the bearing angle signals from the arithmetic unit, and for exchanging data by connecting with external electrical equipment; a display conversion unit for converting the electrical signals from the control unit or the storage unit in conformity with a predetermined display technique; and a display unit for displaying values converted by the display conversion unit.

Also, an electronic stereo clino-compass is provided where all of the components of the clino-compass are encased within a single integral casing or the components of the clino-compass are divided into a measuring part and a display part which are encased within two separate casings connected to each other by a communications line, in such a manner that data taken when measuring is displayed on the display part.

According to this invention, the electrical signals output by the inclination angle sensors and the azimuth sensors are amplified and converted into digital signals, and then undergo an arithmetic process according to a procedure designated beforehand. These results are then converted into a form suitable for use with the desired display method by a display conversion unit, the converted measured values are displayed by the display unit and then put into the memory unit. The contents of this memory unit can be transferred to external equipment if deemed necessary, so that the data gathered can be processed as a whole.

Also, if the overall unit is formed within a single body casing, as the whole thing becomes a single unit, its handling can be taken advantage of. Further, if the measuring part and the display part which make up the whole unit are housed in separate casings respectively, as the display part can be used in a different place which is isolated from the measuring unit, it is possible to carry out measurements in confined areas, thus giving this invention greater flexibility.

DETAILED DESCRIPTION OF THE PREFERRED EMBODIMENTS

First, the operation principle of the present invention will be described with reference to FIG. 1.

Figure 1:
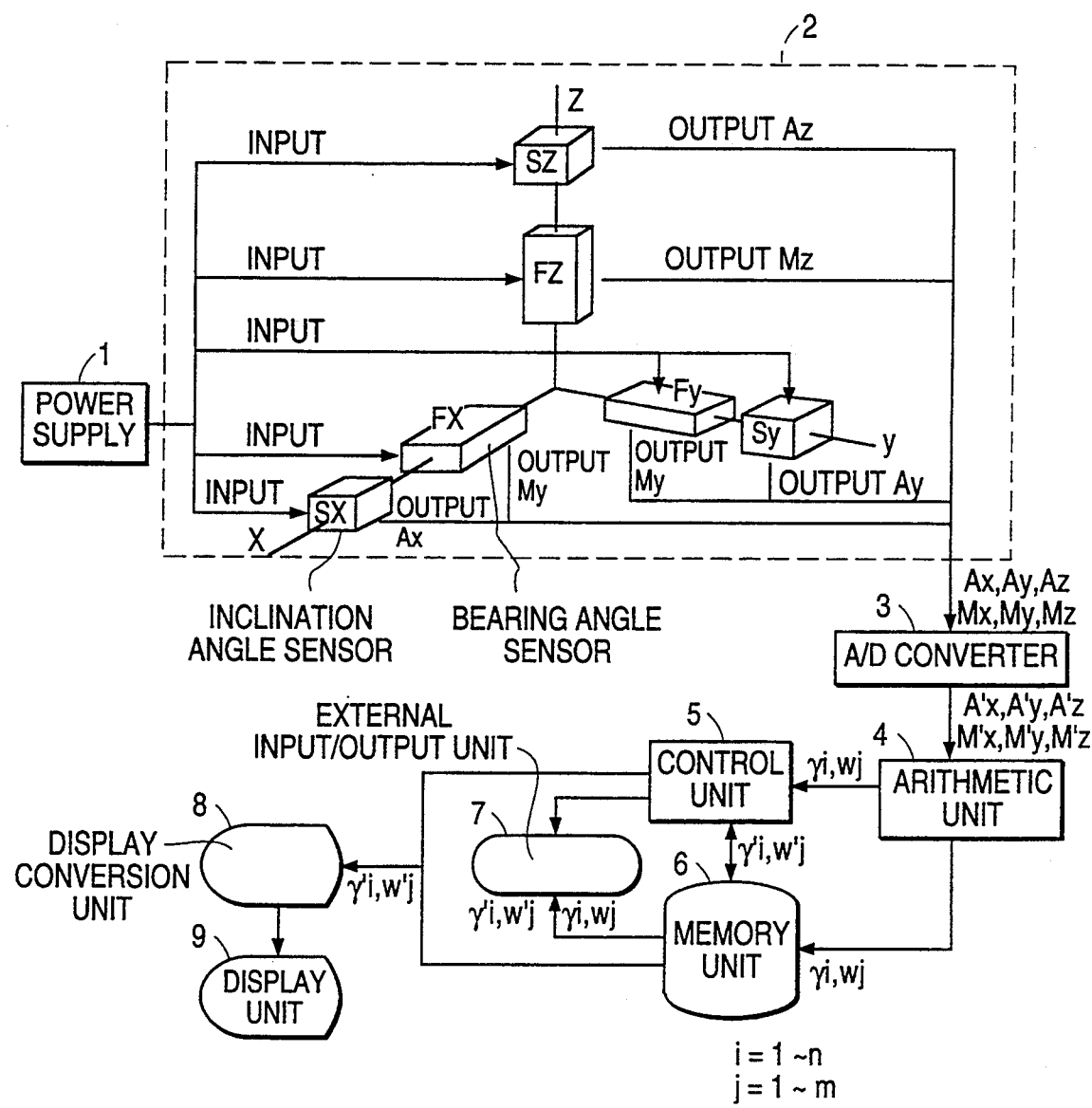
FIG. 1 is a block diagram for describing the theory of operation of the present invention.

In FIG. 1, the reference numeral 1 indicates a power supply which supplies electrical power to each of the circuits used, reference numeral 2 indicates a sensor section within which inclination angle sensors Sx, Sy and Sz, and azimuth angle sensors Fx, Fy and Fz are arranged about three rectangular axes X, Y and Z, reference numeral 3 indicates an A/D converter, reference numeral 4 indicates an arithmetic unit, reference numeral 5 indicates a control unit, reference numeral 6 indicates a memory unit, reference numeral 7 indicates an external input/output unit, reference numeral 8 indicates a display conversion unit and reference numeral 9 indicates a display unit. Further, the characters Ax, Ay and Az indicate control currents for the inclination angle sensors Sx, Sy and Sz, characters Mx, My and Mz indicate geomagnetically sensitive currents for the azimuth angle sensors Fx, Fy and Fz, characters A'x, A'y and A'z indicate signals of control currents for the inclination angle sensors Sx, Sy and Sz after having been converted to digital signals by the A/D converter 3, characters M'x, M'y and M'z indicate signals of the geomagnetically sensitive currents for the sensors Fx, Fy and Fz after having been converted to digital signals by the same A/D converter 3, character $Y_i$ indicates azimuth angle signal on a horizontal plane normal to the direction of gravity and character $\omega_j$ indicates angle of inclination signal to a horizontal surface, arithmetically calculated by the arithmetic unit 4 characters $Y'_i$ and $\omega'_j$ indicate azimuth angle signal and angle of inclination signal respectively produced from control unit 5 after the control process.

In the above electronic stereo clino-compass, angle sensors Sx, Sy and Sz, azimuth angle sensors Fx, Fy and Fz and other units therein are supplied with electrical power by the power supply 1. Analogue electrical signals of Ax, Ay, Az, Mx, My and Mz sensed by the inclination angle sensors Sx, Sy, Sz and the azimuth angle sensors Fx, Fy and Fz are sent to the A/D converter 3 where they are each converted to digital signals. Electrical signals A'x, A'y, A'z and M'x, M'y, M'z converted by the A/D converter 3 are also sent to the arithmatic unit 4, wherewith arithmatic unit 4 computes, by use of a mathematical algorithm, the azimuth angle signal $Y_i$, which means the angle on a horizontal plane normal to the direction of gravity, and the angle of inclination signal $\omega_j$, which means the angle to a horizontal surface, and further output them both to the memory unit 6 and the control unit 5.

The control unit 5 can be switched between an operating state and a non-operating state through a switching device (not shown) in accordance with the judgment of an operator where the measured data is directly controlled by its own program or indirectly controlled by an external signal through the external input/output unit 7.

The control unit 5 is capable of exchanging data with the memory unit 6 The electrical signals $Y'_i$ and $\omega'_j$ outputted from the control unit 5 and/or the memory unit 6 are sent to the display conversion unit 8 where the data is converted to intended data using a predetermined display method before being displayed by the display unit 9.

The storage unit 6 is capable of exchanging data via the external input/output unit 7 by connecting with external electrical equipment, outputting stored data to external equipment and inputting and storing data from external equipment. The control unit 5 also has a further function capable of selecting necessary data to display or not to display in accordance with the intended application of the instrument.

Figure 2:
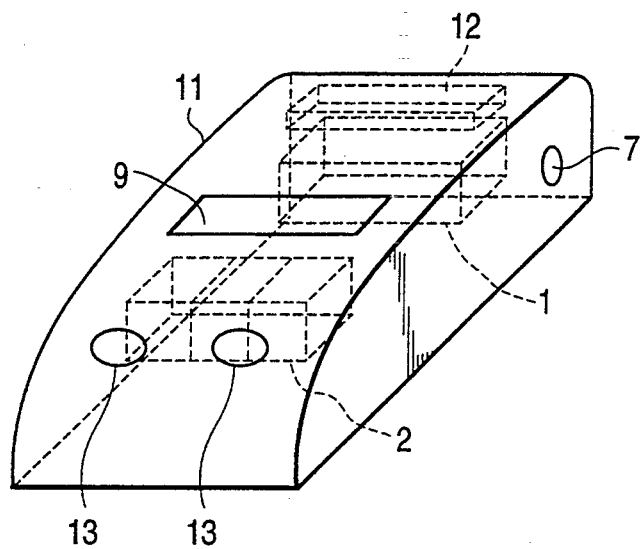
FIG. 2 is a schematic diagram of an embodiment of a integrated electronic stereo clino-compass.
Figure 3:
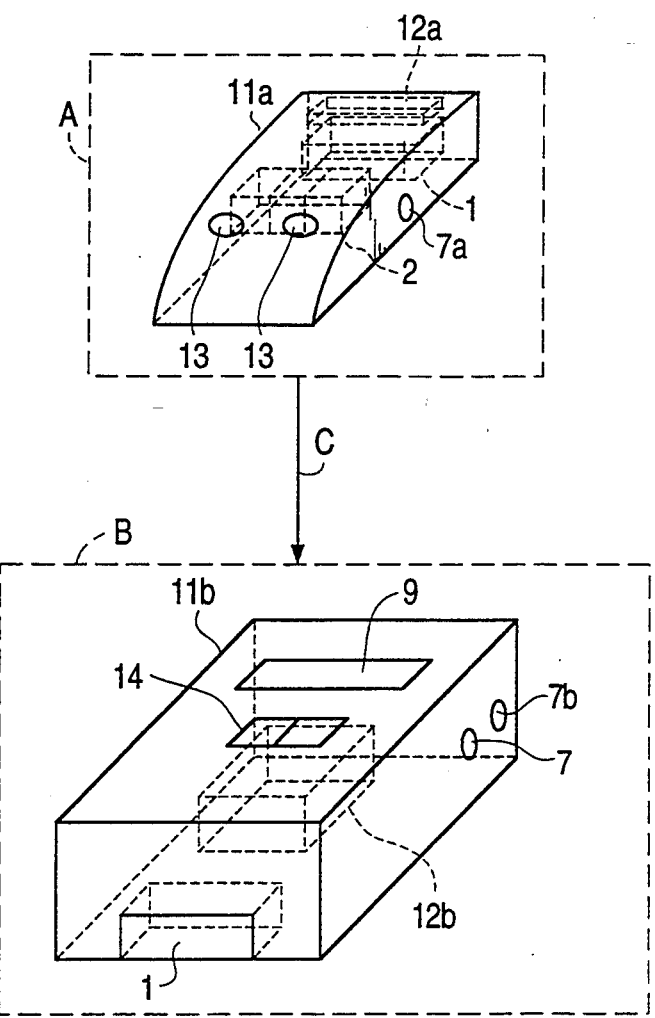
FIG. 3 is a schematic diagram of another embodiment of an electronic stereo clino-compass.
Figure 4:
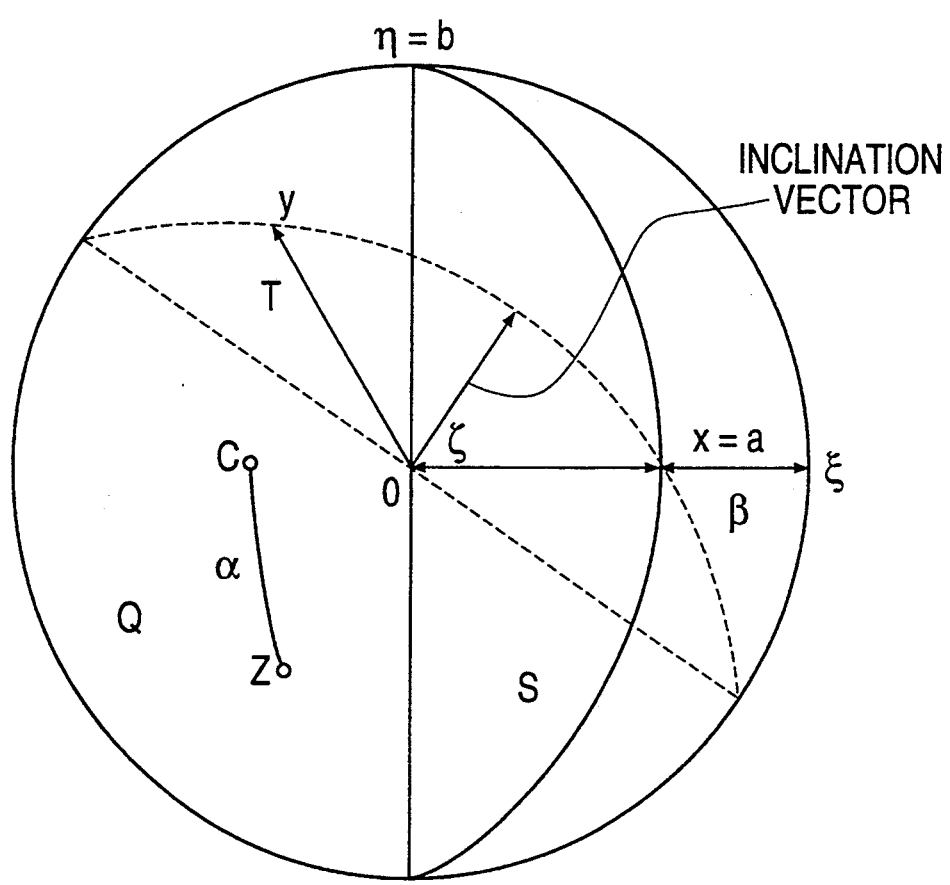
FIG. 4 is a diagram illustrating the theory of the present invention by the stereo projection method.

FIG. 2 is a view of an integrated electronic stereo clino-compass according to one embodiment of the present invention and FIG. 3 is a view of a separate type electronic stereo clino-compass according to another embodiment of the present invention. In FIGS. 2 and 3, reference numeral 1 indicates a power supply, reference numeral 2 indicates a sensor section, reference numeral 7 indicates an external input/output unit, reference numeral 7a indicates an external output unit, reference numeral 7b indicates an external input unit and reference numeral 9 indicates a display unit. Reference numerals 11, 11a and 11b indicate a casing which characterizes these embodiments, reference numerals 12, 12a and 12b indicate circuit boards, respectively, reference numeral 13 indicates a control switching unit and reference numeral 14 indicates a display switching unit.

In the embodiment of the separate type electronic stereo clino-compass in FIG. 3, character A indicates a measurement part, character B indicates a display part and character C indicates a transmission part.

If the A/D converter 3, arithmetic unit 4, control unit 5, memory unit 6 and the display conversion unit 8 are placed on the circuit board 12a for the measurement part A in this case, arithmetic results can be displayed by using a handy computer as the display part B. This measurement data can then also be used, for example, for data management and for data processing with external data.

With this kind of unit, the azimuth and inclination angle of the target surface can be measured quickly by aiming the surfaces of the casing 11 and 11a directly at the target surface to be measured, calculating a value from this measurement and then displaying the result.

As the display part B has a display conversion function, the display unit can effect display using various display methods.

This separation type compass can be used with the measuring part A and the display part B at separate places while being connected together by the communications part C. This means that just the measuring part A can be used to take measurements in restricted areas such as narrow spaces, with the display part B being set up in a different area, so that a wide range of uses can be dealt with.

Next, a logical description of the basis of the arithmetic for this invention will be given by describing the stereo projection technique and the equations involved with reference to FIGS. 4 to 10.

Figure 5:
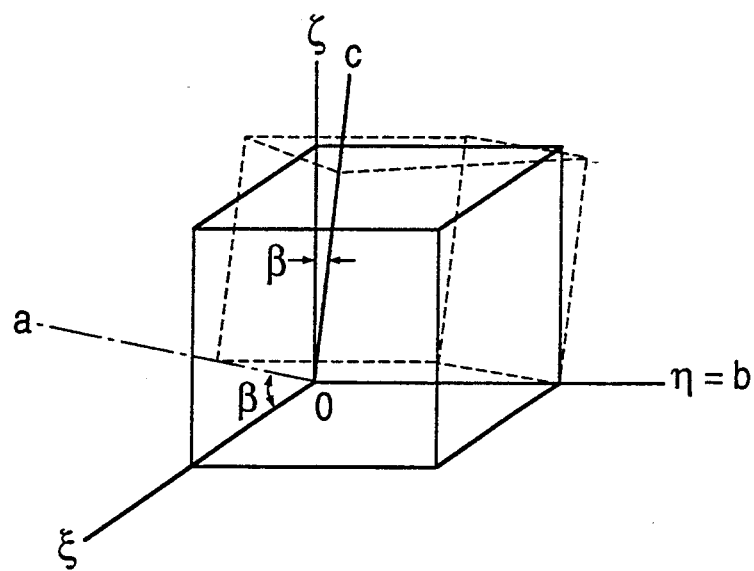
FIG. 5 is a diagram of a rotation of coordinates about the three dimensional axes $\xi$, $\eta$ and $\zeta$.
Figure 6:
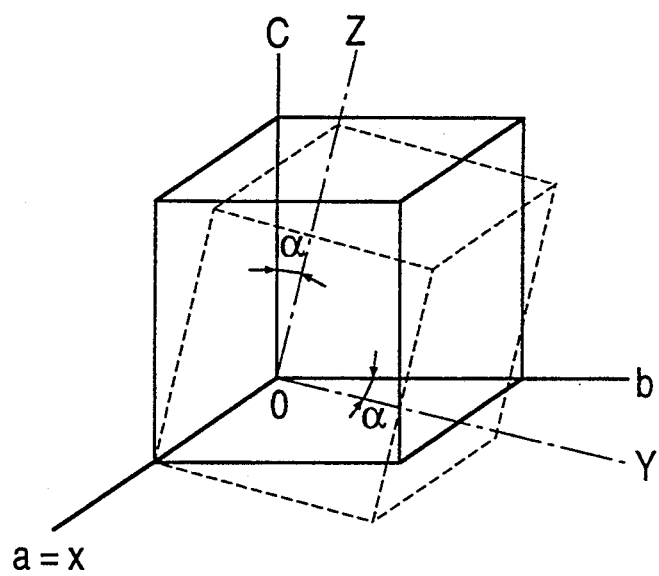
FIG. 6 is a diagram showing a rotation of coordinates about the three dimensional axes a, b and c.

(1) Description of the stereo projection technique
  (a) A three axis coordinate system, which meet each other at right angles, with an origin O and axes $\xi$, $\eta$ and $\zeta$ (FIG. 4) is taken on the absolutely flat spatial plane Q in a stereo network.
  (b) First, a rotation is carried out centering around the $\eta$ axis to the extent of an arbitrary angle $\beta$ in the clockwise direction (FIG. 5). As a result, a three axis coordinate system after the rotation has axes a, b and c and origin O and the plane is taken "S".
  (c) If the axis $\eta$ is equal to the axis b, the axis c becomes line segment Oc which joins the limit and the center of the rotated plane O. The a axis can be shown to be Oa and the maximum inclination direction and angle of the plane can be shown to be the Oa.
  (d) Next, a rotation is carried out centering around the a-axis to the extent of an arbitrary angle $\alpha$ in the clockwise direction (FIG. 6) and the plane after the rotation is taken as being T. This corresponds to shift the point c shown by the small circle on the stereo network with the angle $\alpha$. The point after the shift is indicated by point z.
  (e) The point z becomes the limit for the plane T, and the plane T can easily be formed on the stereo network.
  (f) The coordinates system of the plane T can then be taken as having an origin O and axes x, y and z. This coordinate system coincides with the coordinate system for the unit.
  (g) In an arbitrary coordinate system it is necessary to have rotation about the z axis. However, by showing the actual measured values as changes in components occurring in each of the directions for the unit coordinates system of origin O and axes x, y and z, the direction of gravity coincides with the absolutely vertical axis $\zeta$ under normal conditions and so the rotation can be disregarded. By carrying out the above process on the stereo network, the relationship between the spatial coordinate system of origin O and axes $\xi$, $\eta$ and $\zeta$ and the coordinate system for the unit of origin O and axis x, y and z can be easily worked out.

(2) Coordinate conversion matrix calculations
According to the description of the stereo projection technique in (1), the relationship between the spatial coordinates of origin O and axes $\xi$, $\eta$ and $\zeta$ and the unit coordinates of origin O and axes x, y and z can be shown to be calculated as a matrix.
  (a) With regards to the spatial coordinate system of origin O and axes $\xi$, $\eta$ and $\zeta$ and the unit coordinates of origin O and axes a, b and c, in the case where a rotation through an arbitrary angle $\beta$ is made centering around the $\eta$ axis, the relationship between the coordinate systems can be shown as follows.

$\xi = a \cdot \cos\beta - c \cdot \sin\beta$
$\eta = b$
$\zeta = a \cdot \sin\beta + c \cdot \cos\beta$ (b) Next, with regards to the coordinate system of origin O and axes a, b and c and the unit coordinate system of origin O and axes x, y and z, in the case where a rotation through an arbitrary angle $\alpha$ is made centering around the a-axis, the relationship between the coordinate systems can be shown as follows.

$a = x$
$b = y \cdot \cos\alpha + z \cdot \sin\alpha$
$c = -y \cdot \sin\alpha + z \cdot \cos\alpha$ (c) According to the above relationship, the relationship between the spatial coordinate system or origin O and axes $\xi$, $\eta$ and $\zeta$ and the unit coordinate system of origin O and axes x, y and z can be shown to be as follows.

$$\begin{vmatrix} \xi \\ \eta \\ \zeta \end{vmatrix} = [D] \begin{vmatrix} x \\ y \\ z \end{vmatrix}$$

Here the first part of the right hand side of this equation is a coordinates conversion matrix which can be described as follows.

$$[D] = \begin{vmatrix} \cos\beta & \sin\alpha \cdot \sin\beta & -\cos\alpha \cdot \sin\beta \\ 0 & \cos\alpha & \sin\alpha \\ \sin\beta & -\sin\alpha \cdot \cos\beta & \cos\alpha \cdot \cos\beta \end{vmatrix}$$

(3) Calculating the gravity vector G and inclination angle of the axis z

The direction of the gravity vector G will normally coincide with the $\zeta$-axis of the spatial coordinate system of origin O and axes $\xi$, $\eta$ and $\zeta$. With regards to the unit coordinate system of origin O and axes x, y and z, each of the component vectors of the gravity vector to be measured G are taken as being Gx, Gy and Gz, with the spatial angles between these component vectors being $\Phi$, $\chi$ and $\Psi$ respectively, this becomes $$G = \sqrt{(Gx^2 + Gy^2 + Gz^2)}$$

Figure 7:
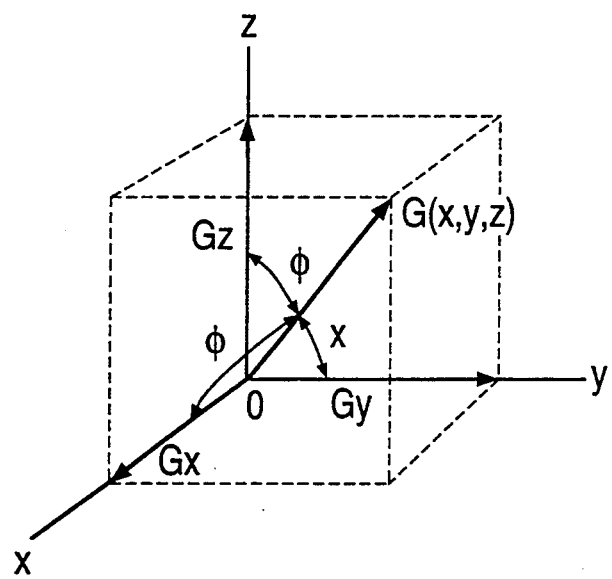
FIG. 7 is a diagram of the inclination between the gravity vector G and the z axis.

$\cos\phi = Gx/G$, $\cos\chi = Gy/G$, $\cos\Psi = Gz/G$
$\phi = \cos^{-1}(GX/G)$, $x = \cos^{-1}(Gy/G)$,
$\psi = \cos^{-1}(Gz/G)$ where $\psi$ is shown to be the limit of the inclination angle (FIG. 7).

Figure 8:
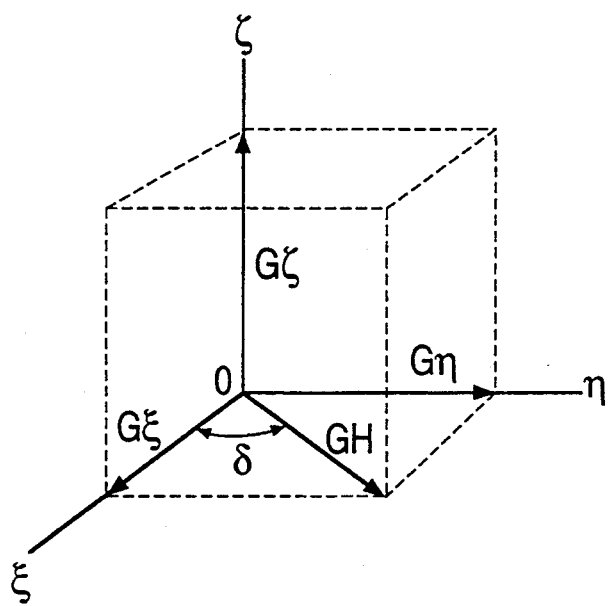
FIG. 8 is, in continuation with FIG. 7, a diagram showing the azimuth angle of the gravity vector G in a horizontal plane.
Figure 9:
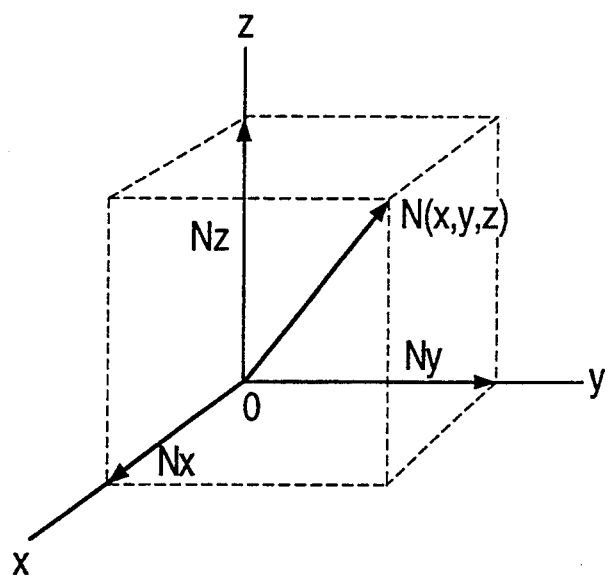
FIG. 9 is a diagram showing each component vector of geomagnetic vectors N.

Also, the relationship between the spatial coordinate system of origin O and axes $\xi$, $\eta$ and $\zeta$, the vector $G(\zeta)$ occurring in the unit coordinate system of origin O and axes x, y and z and Gx, Gy and Gz is shown by $$\begin{vmatrix} Gx \\ Gy \\ Gz \end{vmatrix} = \begin{vmatrix} \cos\beta & 0 & \sin\beta \\ \sin\alpha\cdot\sin\beta & \cos\alpha & -\sin\alpha\cdot\cos\beta \\ -\cos\alpha\cdot\sin\beta & \sin\alpha & \cos\alpha\cdot\cos\beta \end{vmatrix} \begin{vmatrix} 0 \\ 0 \\ G \end{vmatrix}$$

where
$Gx = G\cdot\sin\beta$
$Gy = -G\cdot\sin\alpha\cdot\cos\beta$
$Gz = G\cos\alpha\cdot\cos\beta$
$\beta = \sin^{-1}(Gx/G)$ or $\beta = \tan^{-1}\{(-Gx/Gy)\sin\alpha\}$
$\alpha = \tan^{-1}(-Gy/Gz)$ Next, the direction of the z-axis occurring in the spatial coordinate system of origin O and axes $\xi$, $\eta$ and $\zeta$ is obtained (FIG. 8).

By making the values of the component vectors occurring along each of the axial directions of the unit coordinate system of origin O and axes x, y and z when converted to the spatial coordinate system of origin O and axes $\xi$, $\eta$ and $\zeta$, the values are taken as being $G\xi$, $G\eta$ and $G\zeta$;

$$\begin{vmatrix} G\xi \\ G\eta \\ G\zeta \end{vmatrix} = [D] \begin{vmatrix} Gx \\ Gy \\ Gz \end{vmatrix}$$

If the angle between the $\xi$-axis and projected vector GH on level plan of the $z(\zeta)$ is made to be $\delta$;
$\tan\delta = G\eta/G\xi$
$\delta = \tan^{-1}(G\eta/G\xi)$ (4) Calculation of the bearing angle of the plane of the geomagnetic vector If each of the component vectors occurring in the unit coordinate system of origin O and axes x, y and z for the geomagnetic vector N are made to be Nx, Ny and Nz (FIG. 9), the magnitude of the geomagnetic vector is given by $$N = \sqrt{(Nx^2 + Ny^2 + Nz^2)}$$

Figure 10:
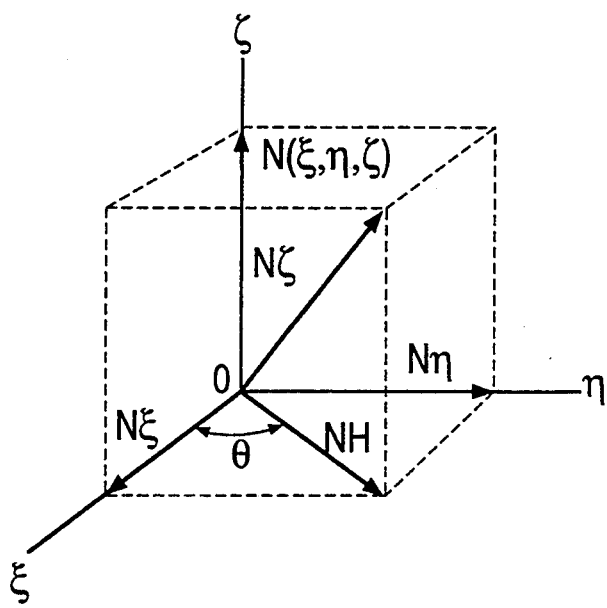
FIG. 10 is, in continuation with FIG. 9 a diagram showing the azimuth angle of the geomagnetic vector N in a horizontal plane.

For the case where each of the component vectors for the unit coordinate system of origin O and axes x, y and z are converted to the spatial coordinate system of origin O and axes $\xi$, $\eta$ and $\zeta$, the relationship between the component vectors $N\xi$, $N\eta$, and $N\zeta$ is given by (FIG. 10);

$$\begin{vmatrix} N\xi \\ N\eta \\ N\zeta \end{vmatrix} = [D] \begin{vmatrix} Nx \\ Ny \\ Nz \end{vmatrix}$$

If the projection going to the $\xi\eta$ plane of the geomagnetic vector $N(\xi\eta\zeta)$ occurring in the spatial coordinate system of origin O and axes $\xi$, $\eta$ and $\zeta$ is taken to be $NH(\xi\eta\zeta)$ and the angle between this vector and the $\xi$ axis is taken to be $\theta$;
$\tan\theta = N\eta/N\xi$  $\theta = \tan^{-1}(N\eta/N\xi)$ According to the calculation above, the unknowns $\alpha$, $\beta$, $\theta$, $\Phi$, x and $\psi$ can be obtained, and the bearing angle and inclination angle of the limit of the target surface being measured can be calculated.

With the electronic stereo clino-compass provided as the integrated type and the separate type, making calculations from signals measured at the sensor section or part and displaying them at the display unit or part in the way described above, this invention has the following effects.

(1) When using for surveying (a) By being able to display magnetic north as a basis for normal operation it becomes possible for any engineer to carry out surveying easily. This is to say that it is no longer necessary to spread the base points of the surveying over, for example, three base points as used in the conventional method so that map coordinates can be used in their place.

(b) By connecting this compass with a personal computer, the time taken up with data processing can be made much shorter.

(c) As this compass can be incorporated into other surveying equipment as a single unit, surveying can be carried out by one person. This is to say that, in general construction, survey points can be set up building structures according to a design map on natural landscapes and however, under the above condition, if the compass is incorporated into other survey equipment so as to combine to highly precise unit which displays information clearly, the positioning on the landscape becomes very clear and it is possible to carry out all of the construction surveying alone.

(d) As the unit is electronic and of a unit type, it is possible to make highly accurate measurements.

(2) Using for soil quality investigation (a) The direction and angle at which non continuous surfaces of soil layers can be measured accurately and quickly. Conventionally, when investigating discontinuous surfaces of soil layers an engineer specialized in soil quality would use the clinometer to take for the direction and the inclination, record the results, take them home and then analyze them at a desk. However, by using this compass, as the values for the results for the measured data are displayed, even somebody who is not a specialized soil quality engineer can carry out these investigations quickly and accurately.

(b) Processing of the measurement data becomes simple. Namely, this compass stores items such as measured values, date and time of measurements etc. in it's memory unit. This means that at a later date, by connecting to a computer and/or external electronic equipment and then transmitting the recorded data, complicated data processing can be carried out simply and at high speed. Further, measurements which were taken beforehand can then be processed afterwards.

(c) Measurement is carried out without errors. Namely, the control unit can be used to confirm the measured data, determine and remove abnormal values so that precision can be improved upon by the removal of these errors.

(d) Stability of operation can be maintained. This means that when carrying out work into the investigation of soil quality, it becomes possible to carry out measurements under all kinds of measurement conditions. There will also be cases where measurements will be taken under dangerous conditions. However, as this compass is capable of taking measurements by coming into contact with any form of target surface to be measured, it can be operated in a much safer manner than the method in the conventional art.

What is claimed is:

1. An electronic stereo clino-compass comprising:
   (a) a sensor assembly containing a three-axis inclination angle sensor for outputting electrical signals indicative of an inclination angle of a plane of an object relative to a horizontal reference plane and a three-axis azimuth angle sensor for outputting electrical signals indicative of an azimuth angle of the plane of the object relative to the horizontal reference plane, said three axis inclination angle sensor and said three-axis azimuth angle sensor being composed of three sensor pairs of an inclination angle sensor and an azimuth angle sensor, each sensor pair allocated to a respective axis of a three axis coordinate system;
   (b) an analogue-to-digital converter for outputting digital signals converted from said electrical signals outputted from said sensor assembly;
   (c) an arithmetic means for computing and outputting data denoting an overall inclination angle and an overall azimuth angle of the plane of the object based on the digital signals output from said analogue-to-digital converter;
   (d) a memory means for storing the data denoting the overall inclination angle and the overall azimuth angle output from said arithmetic means, said memory means operatively connectable to an external device so as to supply data to said external device;
   (e) a display conversion means for converting the data output from said arithmetic means into display data in conformity with a predetermined display criteria;
   (f) display means for displaying the display data obtained by said display conversion means;
   (g) control means for sending the data outputted from said arithmetic means to the memory means, controlling the memory means to send data to the external device, and outputting the data outputted from the arithmetic means to the display conversion means;
   wherein said arithmetic means computes and outputs as the data denoting the overall azimuth angle an angle between an intersection line between the plane of the object and the horizontal reference plane and a line extending in a magnetic north direction from the intersection line, and wherein said arithmetic means computes and outputs as the data denoting the overall inclination angle an angle between a line extending perpendicular to the intersection line within the horizontal reference plane and a line extending along a maximum inclination vector of the plane of the object perpendicular to the intersection line, and wherein the overall azimuth angle and the overall inclination angle together define a normal vector of the plane of the object.

2. An electronic stereo clino-compass according to claim 1, wherein said sensor assembly, said analogue-to-digital converter, said arithmetic means, said memory means, said display conversion means, said display means and said control means are encased within a single integral casing.

3. An electronic stereo clino-compass according to claim 1, wherein compass are said sensor assembly, said analogue-to-digital converter, said arithmetic means, said memory means, said display conversion means, said display means and said control means divided into a measuring part and a display part which are respectively encased within two separate casings connected to each other by a communication line in such a manner that data obtained in said measuring part is displayed on said display part.

* * * * *